United States Patent [19]
Brown

[11] Patent Number: 5,685,362
[45] Date of Patent: Nov. 11, 1997

[54] STORAGE CAPACITY IN HOT DRY ROCK RESERVOIRS

[75] Inventor: Donald W. Brown, Los Alamos, N. Mex.

[73] Assignee: The Regents of the University of California, Alameda, Calif.

[21] Appl. No.: 589,830

[22] Filed: Jan. 22, 1996

[51] Int. Cl.$^6$ ............................................. F28D 21/00
[52] U.S. Cl. .................. 165/45; 60/641.3; 166/302
[58] Field of Search .................. 165/1, 45; 60/641.3; 166/302, 271

[56] References Cited

U.S. PATENT DOCUMENTS

| | | | |
|---|---|---|---|
| 3,786,858 | 1/1974 | Potter et al. | 165/45 |
| 3,817,038 | 6/1974 | Paull et al. | 165/45 X |
| 3,863,709 | 2/1975 | Fitch | 165/45 |
| 4,043,386 | 8/1977 | Franz et al. | 165/45 |
| 4,112,745 | 9/1978 | McCabe et al. | 165/45 X |
| 4,201,060 | 5/1980 | Outmans | 165/45 X |
| 4,357,802 | 11/1982 | Wahl, III et al. | 650/641.3 X |
| 4,458,492 | 7/1984 | Ziegenhain | 60/641.3 X |
| 4,712,380 | 12/1987 | Smith | 60/641.2 |
| 5,311,741 | 5/1994 | Blaize | 60/641.2 |

OTHER PUBLICATIONS

Donald Brown et al., "Using A Hot Dry Geothermal Reservoir For Load Following," Draft paper distributed at Geothermal Reservoir Engineering Conference, Jan. 24–26, 1995.

D. W. Brown et al., "The Pressure Dilation of A Deep, Jointed Region of the Earth," Proceedings of the International Symposium on Rock Joints, Loen, Norway, pp. 519–525 (Jun. 4–6, 1990).

J. W. Tester et al., "Hot Dry Rock Geothermal Energy–A New Energy Agenda for the 21st Century," Los Alamos National Laboratory report LA–11514–MS, issued Jul. 1989, pp. 1–30.

Donald Brown et al., "Using A Hot Dry Rock Geothermal Reservoir for Load Following," Proceedings Twentieth Workshop Geothermal Reservoir Engineering, Jan. 24–16, 1995.

*Primary Examiner*—Leonard R. Leo
*Attorney, Agent, or Firm*—Richard J. Cordovano

[57] ABSTRACT

A method of extracting thermal energy, in a cyclic manner, from geologic strata which may be termed hot dry rock. A reservoir comprised of hot fractured rock is established and water or other liquid is passed through the reservoir. The water is heated by the hot rock, recovered from the reservoir, cooled by extraction of heat by means of heat exchange apparatus on the surface, and then re-injected into the reservoir to be heated again. Water is added to the reservoir by means of an injection well and recovered from the reservoir by means of a production well. Water is continuously provided to the reservoir and continuously withdrawn from the reservoir at two different flow rates, a base rate and a peak rate. Increasing water flow from the base rate to the peak rate is accomplished by rapidly decreasing backpressure at the outlet of the production well in order to meet periodic needs for amounts of thermal energy greater than a baseload amount, such as to generate additional electric power to meet peak demands. The rate of flow of water provided to the hot dry rock reservoir is maintained at a value effective to prevent depletion of the liquid inventory of the reservoir.

8 Claims, 4 Drawing Sheets

STORAGE CAPACITY IN HOT DRY ROCK RESERVOIRS

FIELD OF THE INVENTION

This invention relates to the fields of geology and rock mechanics and, more specifically, to extraction of thermal energy from rock formations beneath the surface of the earth. This invention was made with government support under Contract No. W-7405-ENG-36 awarded by the U.S. Department of Energy to the Regents of the University of California. The government has certain rights in the invention.

BACKGROUND OF THE INVENTION

Geologic strata having high temperatures are found in numerous locations around the globe. When ground water percolates down into these formations, the water is heated and may flow to the surface as geysers and hot springs. When a formation is dry, heat may be recovered by means of the hot dry rock (HDR) process. Water is pumped down a well drilled into the hot rock and heated by contact with the rock. The heated water is then recovered through the same well or another well drilled into the same rock formation. If the rock in its natural state does not have a sufficient network of cracks and fissures for the water to flow through to pick up heat, as is the usual case, it is fractured to produce such a network by means of fluid pressure.

Today, energy is supplied primarily by fossil fuels such as coal, oil, and gas. These resources are finite and are expected to be in short supply in the readily foreseeable future. Also, it appears that use of fossil fuels cause serious environmental problems. Further, the United States currently imports a large percentage of its oil. Dependence on foreign oil is increasing as domestic reserves diminish. Thus, it is necessary to develop alternative sources of energy. When coal is burned, significant amounts of sulfur and nitrogen oxides are released to the atmosphere. These gases combine with water in the atmosphere to produce acids, which are brought to earth by rainfall downwind of the emissions source. This "acid rain" has a deleterious effect on aquatic and plant life. On a more long-range scale, the world appears to be warming steadily because of the "greenhouse effect" which is caused by large quantities of carbon dioxide being released to the atmosphere as a result of burning of fossil fuels. The long-term consequences of the greenhouse effect are currently a matter of debate; they may include melting of the polar ice caps, with the resultant increase in sea level and flooding of coastal cities, and increased desertification of the planet. Evidence pointing toward greenhouse effect warming includes increases in the carbon dioxide content of the atmosphere over the past century and weather records that seem to indicate an upward trend in atmospheric temperatures. These facts point to the need to consider mitigating action now, before we are overtaken by our own emissions.

Hydropower, the world's primary non-fossil energy source, is both cheap and clean. It has been widely developed in many parts of the world, but will never fill more than a small part of the world's total energy needs. Other alternative energy sources are nuclear fission, solar, wind, fusion, and geothermal. Nuclear fission is already widely used, but is currently suffering from a lack of public confidence, particularly in the United States, as the result of incidents such as Three Mile Island and Chernobyl. There are no new nuclear power plants currently in the planning or construction stages. Solar power has been demonstrated on a small scale, as has wind power. Although both of these are renewable energy sources, they are subject to the whims of local weather conditions and can be relied upon to deliver power only intermittently. Nuclear fusion is, potentially, an almost unlimited source of energy, relying for fuel upon isotopes of hydrogen, which are found in abundant amounts in seawater. However, fusion has been unambiguously demonstrated only in the highly intractable form of a thermonuclear explosion. It is likely to be decades before ignition and containment of a fusion reaction by controllable, non-nuclear ignition sources, such as lasers, will be developed to the point where nuclear fusion may find practical application as a power source.

Geothermal resources, in the form of naturally occurring hydrothermal fluids, are being exploited today to provide useful energy as electrical power or heat in many parts of the world. At present, hydrothermal sources provide only a minute fraction of the world's energy needs, though the potential resource base available for exploitation is of the same order of magnitude as fossil fuel resources. Hydrothermal resources are much cleaner than fossil fuels with regard to greenhouse gas emissions, generally releasing only about 10 percent or less of the amount of carbon dioxide produced by burning an energy-equivalent amount of fossil fuel. However, hydrothermal resources are of limited geographical extent, occurring primarily in areas of tectonic or volcanic activity. Thus, many densely inhabited parts of the world are poorly located for the exploitation of hydrothermal sources.

Hot dry rock underlies much of the globe. Unlike hydrothermal resources, HDR is widely distributed about the earth. HDR is a resource of vast magnitude. Like fusion, it can provide an almost unlimited source of energy for the planet. Hydrothermal plants now in operation demonstrate conclusively that the heat of the earth can be used as a practical source of both thermal and electrical energy. The HDR process is a logical extension of hydrothermal technology to tap into a vastly larger and universally distributed energy resource.

Extracting energy from HDR involves creation of a closed liquid circulation system comprised of an HDR reservoir and above-ground equipment. An injection well is drilled into hot dry rock and hydraulic fracturing techniques are used to induce permeability by stimulating existing natural fractures or creating new fractures. Hydraulic stimulation and fracturing are widely used in petroleum recovery. An HDR reservoir is thus created, the size of which is governed by the pressure and volume of the hydraulic fracturing fluid applied to the rock, the nature of the rock structure, and in situ stresses. Liquid is pumped down the injection well, heated by the hot rock of the HDR reservoir, and recovered from a second well, a recovery well, drilled into the reservoir at some distance from the injection well. Multiple injection and recovery wells may be used. Heat exchangers at the surface are used to recover the heat from the water for use in electric power generation or for direct thermal applications. The water is then re-injected into the HDR reservoir via the injection well. In this manner, heat can be continuously mined from otherwise inaccessible geothermal sources. An HDR reservoir which has relatively little leakage can be created, so that an HDR heat recovery process can be operated without significant net consumption of water. Essentially no venting of gaseous or saline fluids to the environment occurs. Thus, the HDR process does not emit carbon dioxide or acid rain precursors, such as sulfur dioxide, and is in the same class as solar, wind, or hydropower in being an environmentally benign source of energy.

It is expected that the primary application of water heated in an HDR reservoir will be to generate steam or to vaporize another working fluid, such as ammonia or isobutane, for use in producing electric power. For this reason, the invention is herein described in terms of this application, though the invention will be useful in other applications requiring quantities of thermal energy which vary in a periodic manner. Companies which provide electric power must have sufficient power generating capacity to meet peak demand, or maximum demand, which usually occurs in the late afternoon of a hot summer day. Power production apparatus which is in reserve must be capable of being brought on-line very quickly, in order to prevent "brown-outs" or load shedding. Load shedding refers to cutting off power to some users in order to avoid catastrophic shut-down of the entire system. Such apparatus is commonly termed "spinning reserve". Spinning reserve power, or peaking power, is costly because the equipment used to generate it is in revenue-generating use only a portion of the time rather than 24 hours a day. Also, the equipment is generally more expensive to purchase and operate than baseload electric power production equipment. The present invention provides a method for meeting peak power demands in a HDR power generating plant. Thus, the invention effectuates use of an HDR power generation system for electric load following. This application may also be termed on-demand power peaking. Peaking power from an HDR system will be cheaper to generate than peaking power from other sources, yet can be sold at the same price as peaking power generated by other means, such as a gas turbine. Use of an HDR system in a periodic mode rather than just to provide baseload power will reduce the total cost of operation of an HDR system. The incremental cost of equipment to operate in peaking mode is expected to be modest.

U.S. Pat. No. 3,786,858, issued Jan. 22, 1974, describes the HDR process. A publication issued by the Los Alamos National Laboratory in Jul., 1989 which is designated LA-11514-MS and entitled "Hot Dry Rock Geothermal Energy—A New Energy Agenda for the 21st Century," describes a number of concepts for use of HDR energy. There are experimental HDR sites in Europe, Japan and the U.S. The Geothermal Resources Council publishes a bulletin dealing with geothermal energy matters.

SUMMARY OF THE INVENTION

This invention is a method of extracting thermal energy, in a cyclic manner, from geologic strata which may be termed hot dry rock. A reservoir comprised of hot fractured rock is established and water or other liquid is passed through the reservoir. The water is heated by the hot rock, recovered from the reservoir, cooled by extraction of heat by a heat exchange apparatus on the surface, and then re-injected into the reservoir to be heated again. Water is added to the reservoir by an injection well and recovered from the reservoir by a production well. Water is continuously provided to the reservoir and continuously withdrawn from the reservoir at two different flow rates, a base rate and a peak rate. Increasing water flow from the base rate to the peak rate is accomplished by rapidly decreasing backpressure at the outlet of the production well in order to meet periodic needs for amounts of thermal energy greater than a baseload amount, such as to generate additional electric power to meet peak demands. The rate of flow of water provided to the hot dry rock reservoir is maintained at a value effective to prevent depletion of the liquid inventory of the reservoir.

In a broad embodiment, this invention is a method for continuously extracting energy from hot rock located beneath the surface of the earth, where the quantity of extracted energy is cycled in a periodic manner, said method comprising: establishing a reservoir comprised of hot fractured rock beneath the surface of the earth; continuously providing cold liquid to said reservoir through at least one injection well, where said injection well extends from the surface of the earth into the reservoir; withdrawing hot liquid from the reservoir through at least one production well at a base rate of flow for a first time period, where said production well extends from the surface of the earth into the reservoir; withdrawing hot liquid from the reservoir through the production well at a peak rate of flow for a second time period, where said second time period is of lesser duration than said first time period, where said peak flow rate is greater than said base flow rate, and where the temperature of hot liquid flowing out of the production well during the second time period is about equal to or greater than the temperature of hot liquid flowing out of the production well during the first time period; continuously repeating the above steps of withdrawing hot liquid at a base rate and at a peak rate; establishing the rate of flow of the cold liquid into the reservoir at a value effective for maintaining the base flow rate and the peak flow rate for a plurality of cycles; and extracting heat from hot liquid to form cold liquid which is provided to the reservoir.

DETAILED DESCRIPTION

This invention is based on the concept that an HDR reservoir can be "inflated" and "deflated"; the reservoir has the property of elasticity. Joints in the rock open as reservoir pressure increases during time periods when water is being withdrawn at a base rate of flow. The joints close as pressure decreases during time periods when water is withdrawn at a peak rate of flow. Thus, water can be pumped into an HDR reservoir, stored, and withdrawn when it is needed. Practice of this invention may be compared to use of pumped storage in hydroelectric power production, where water which passes through turbine-generators is pumped back into a reservoir behind a dam for re-use during periods of peak demand for power. Power produced by the turbine-generators during periods of low demand is used to accomplish the pumping. However, the amount of power required to pump the water is greater than the amount of power received when that water again passes through the turbine generators. In practice of this invention, the value of the power produced from the water stored in the reservoir is greater than the cost of pumping it into the reservoir.

Figure 1:
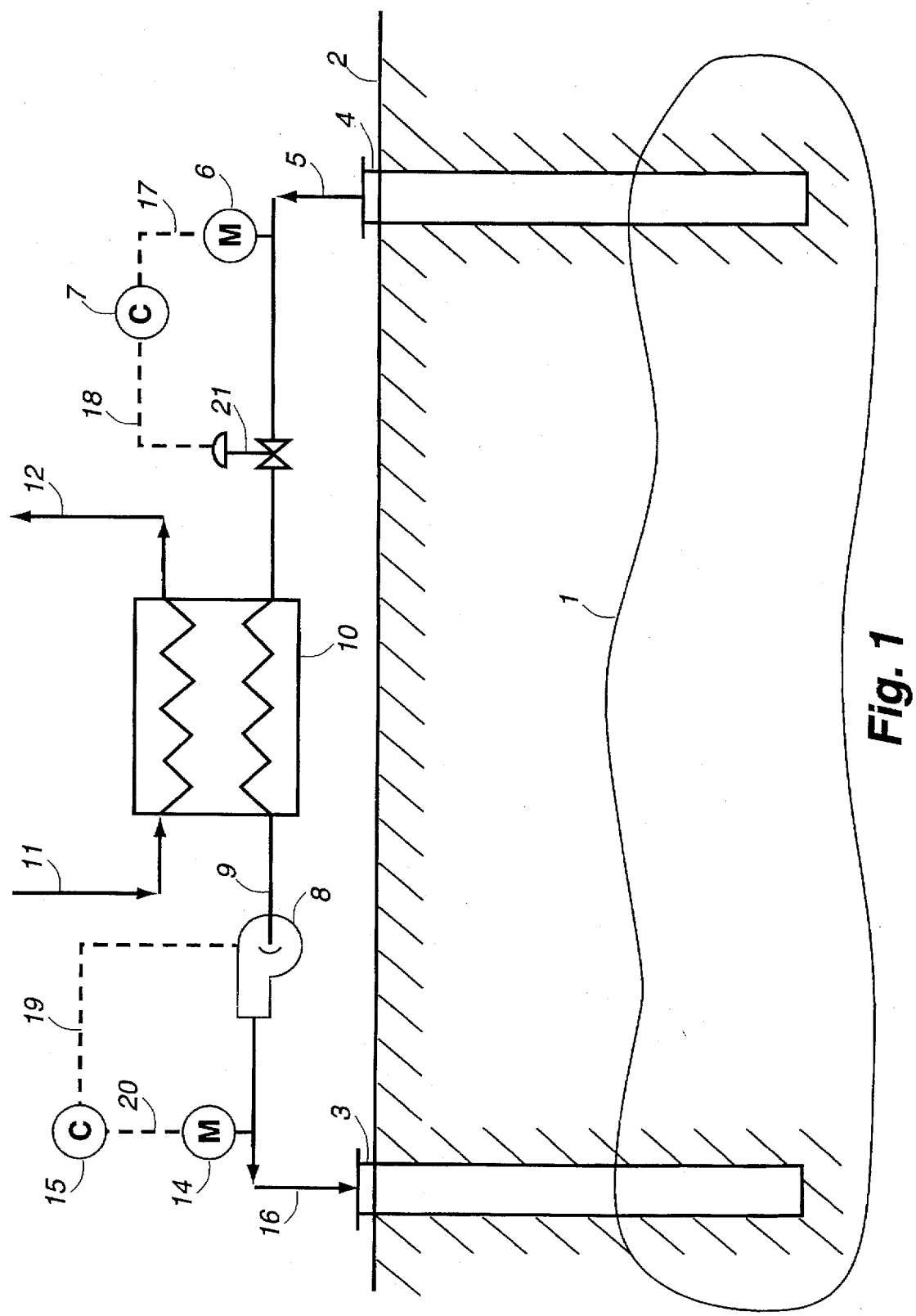
FIG. 1 depicts an injection well and a production well in a hot dry rock reservoir and apparatus for injection of liquid and recovery of heat from the reservoir.

FIG. 1 depicts apparatus which may be used in practice of the invention, as follows. Water is pumped into a hot dry rock formation 1 located beneath the surface of the earth 2 via injection well 3. This water is heated by the hot rock as it passes from the injection well to recovery well 4, or production well 4. It is normally not necessary to pump the water out of the HDR reservoir, since the reservoir is pressurized by means of injection pump 8. Hot water flows from production well 4 to heat exchanger 10 by means of conduit 5. After giving up heat in heat exchanger 10, water flows through conduit 9 to injection pump 8, which pumps it back into the HDR reservoir via conduit 16 and injection well 3. Working fluid is provided to the heat exchanger by conduit 11 and removed from the exchanger through conduit 12. The working fluid is heated by the water recovered from the reservoir and then flashed to steam (or other vapor) which is used to turn a turbine-generator to generate electric power. Make-up water may be added to the system at a point on conduit 9 (not shown) in order to replace water lost by leakage from the reservoir.

Injection pressure may be controlled by pressure control apparatus; pressure is sensed by measuring element 14 and a control signal representative of the pressure in conduit 16 is provided to controller 15 via control lead 20. The controller provides a signal to pump 8, via control lead 19, which adjusts pumping rate in order to supply the value of injection pressure which has been specified by entering it into the controller. Alternatively, water flow into the reservoir may be under flow control. In this case, measuring element 14 is a flow sensor and provide a control signal representative of flow in conduit 16 to controller 15 via control lead 19. Controller 15 provides a signal to pump 8, via control lead 19, which adjusts flow out of the pump.

Rate of flow out of production well 4 is controlled by backpressure control valve 21, to which is provided a control signal via control lead 18. Controller 7 provides the control signal to the valve at a level required to maintain a previously established flow rate entered into the controller. A control signal representative of flow rate in conduit 5 is generated by measuring element 6 and provided to the controller via control lead 17. Alternatively, production well backpressure in conduit 5 may be measured by means of measuring element 6 and a signal representative of that pressure provided to controller 7 by means of control lead 17. Controller 7 then provides a control signal which adjusts backpressure control valve 21 to maintain the desired backpressure.

Other suitable control systems and strategies may be used. For example, a computer programmed with control algorithms may be used to provide instructions to control signal transducers which provide control signals to control, directly indirectly, the four basic controls parameters, which are injection pressure and injection flow and production backpressure and production flow.

A somewhat unsuccessful method for using an HDR reservoir for pumped storage and power peaking, which is distinct from the present invention, is as follows. The reservoir would be shut-in (that is, no water would be recovered) and pressurized with an electrically driven pump during off-peak hours. This would inflate the reservoir with fluid and store mechanical energy through elastic compression of the rock comprising the HDR reservoir. Then, the reservoir would be partially vented during a subsequent period of peak power demand, thus returning the previously stored mechanical energy in the form of a much larger amount of thermal energy. This method was tested at the HDR reservoir operated by Los Alamos National Laboratory at its Fenton Hill site in northern New Mexico. The test consisted of 3 cycles, each consisting of a 16 hour period when the production well was nearly shut-in and an 8 hour period of production at various flow rates ranging from about 140 to about 225 gpm. Flow from the well during the 16 hour periods was maintained at about 25 gpm in order to prevent freezing in surface equipment due to low ambient temperature. Temperature of hot water out of the production well at the start of the first production period was about 225° F. At the start of the second and third cycles, it was about 265° F. Recovered water temperature rose during each production cycle and reached at least 360° F. 3 to 4 hours after the start of the cycle. The lower first cycle start temperature was due to the well being nearly shut-in for 13 days prior to start of the test. This test showed that significantly less energy is produced when the operating cycle includes periods of little or no production, as compared to continuous production. It is expected that the initial production temperatures would have been even lower if the 25 gpm flow had not been maintained during the 16 hour periods. This method of operation is unsuitable for meeting peak power needs.

Figure 2:
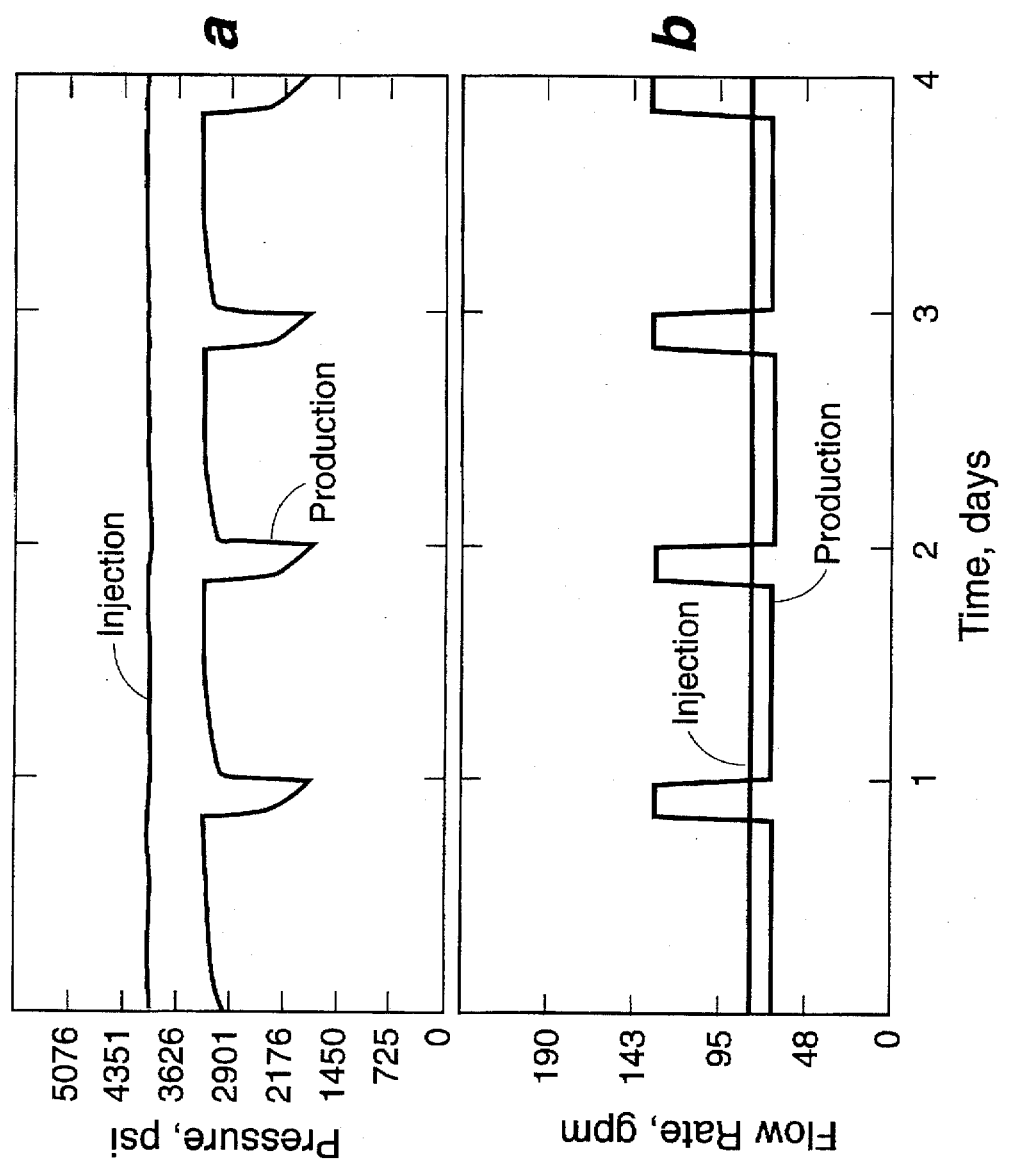
FIG. 2 depicts results of a computer simulation of the invention where the base period is 20 hours and the peak period is 4 hours.

A computer-based transient finite element model of a jointed rock mass, which is called GEOCRACK, has been validated for transient operations using the cyclic reservoir operating data from Fenton Hill mentioned above. GEOCRACK was used to simulate flows and pressures in practice of the invention (the program does not simulate temperatures). It was assumed that there was no leakage from the reservoir. HDR reservoir flow parameters and boundary conditions were established by reference to steady-state operating data obtained from tests at Fenton Hill. FIG. 2 presents results of a simulation. Two of the four primary variables must be specified. In this simulation, injection flow rate and production flow rates were set and GEOCRACK provided injection pressure and production pressure. Injection flow rate was held constant at about 74 gpm, as shown by the straight line of FIG. 2b. Production flow rate was held constant at a base value of 63.5 gpm for a first time period of 20 hours and then increased to a peak value of 127 gpm for a second time period of 4 hours. Since there was no reservoir leakage, the total amount of water injected in each 24 hour period is equal to the total amount recovered in the same period. It can be seen from FIG. 2 that production pressure was increased by the simulated flow control system over each time period of base flow; in order to maintain a constant base flow rate, the simulated valve at the top of the simulated production well had to be steadily moved toward the fully closed position. As the valve is closed down, production backpressure increases. Production backpressure, or wellhead pressure, increased to about 3300 psig at the end of each 20 hour base flow period. Upon start of the peak flow period, the simulated controller caused the simulated backpressure control valve to move toward the fully open position to increase flow rate. Wellhead pressure started dropping and was about 1820 psig at the end of the peak flow period. At the end of the peak flow period, the simulated flow controller moved the simulated wellhead valve toward the fully closed position to a position effective to reduce flow to the base flow rate. Wellhead pressure increased again to about 3230 psig over the 20 hour base period. Production pressure increased very rapidly at first and then the rate of pressure increase tapered off. Injection pressure was varied by the simulated control system, as shown by the substantially horizontal curve of FIG. 2a, though the pressure scale is so large that the injection pressure line appears to be almost straight. Injection pressure required by the GEOCRACK model rose during the base flow period of each cycle and then started to fall at the start of the peak flow period, upon start of reservoir deflation, or draining. Mean injection pressure during the simulation was about 3950 psig. It is to be noted that the low point of production backpressure of about 1820 psig in this simulation is considerably above the minimum allowable production backpressure, which minimum is established by two factors. These are the pressure at which carbon dioxide bubbles begin to form in the water and the pressure at which steam begins to form. The Fenton Hill HDR reservoir is operated such that the production backpressure does not fall below about 500 psig, though the minimum allowable backpressure is below this figure. Thus, there was unused production capacity in the simulated reservoir. It can be seen that peak period power output of the simulated reservoir could be increased by increasing peak flow rate such that the lowest production pressure (at the end of the peak flow period) is closer to the minimum of 500 psig. An alternative method of increasing power output is to increase base period production flow rate.

Figure 3:
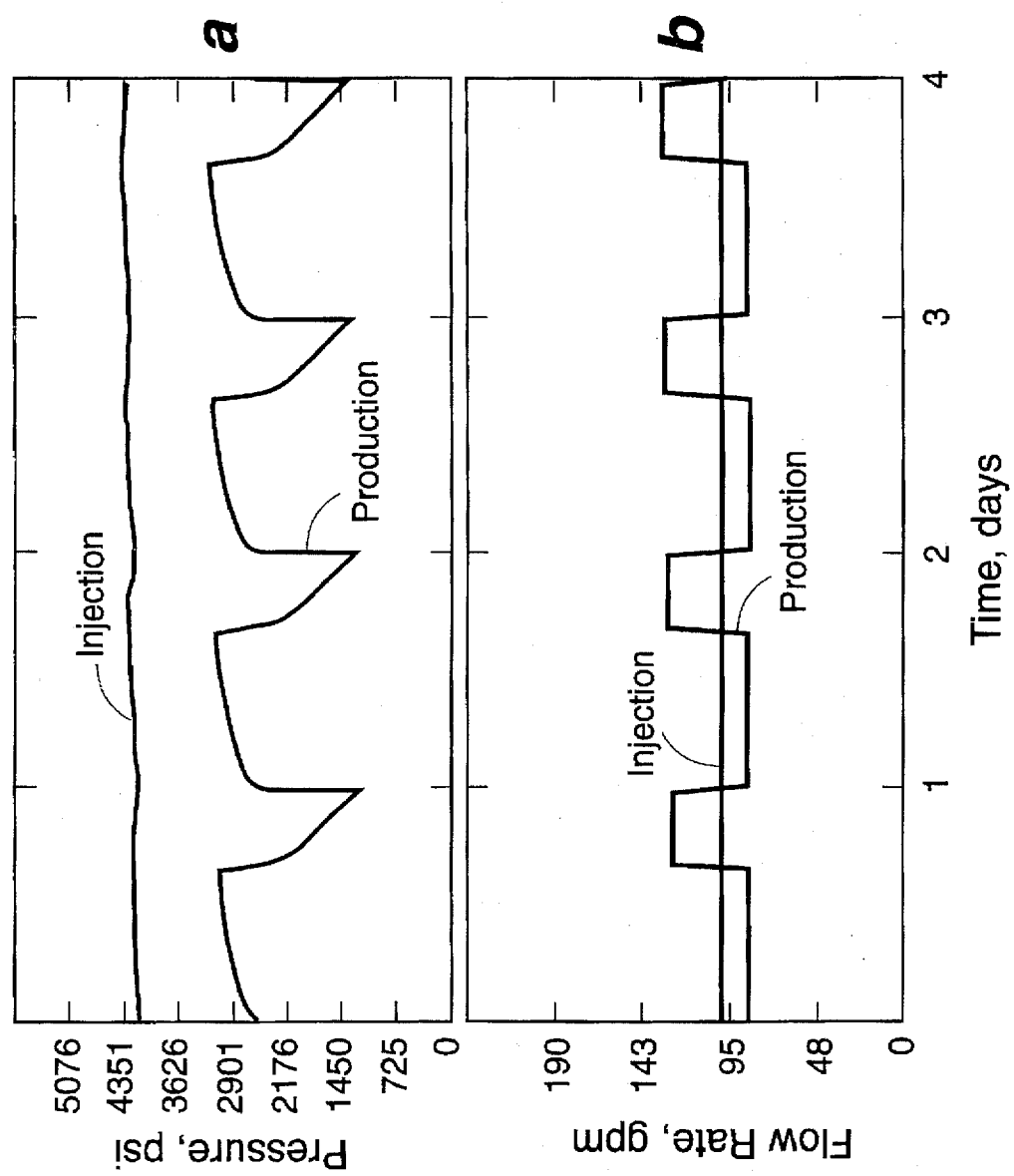
FIG. 3 depicts results of a computer simulation of the invention where the base period is 16 hours and the peak period is 8 hours.

FIG. 3 presents results from a simulation in which 8 hour periods of peak flow were alternated with 16 hour periods of base flow. Simulated peak flow rate was set at 127 gpm, the same value which was used for the 4 hour peak period simulation. In order to maintain this flow rate for 8 hours, GEOCRACK increased simulated injection pressure, so that the mean injection pressure over the entire simulation run was about 4250 psig. In actual practice, this injection pressure could be sufficiently high to cause reservoir growth and increased water loss. This pressure resulted in an increased injection flow (as compared to the 4 hour peak period simulation) of about 99 gpm. In turn, increased injection flow rate results in increased base flow rate, which was about 86 gpm. The high value of production well pressure was about 3150 psig and it declined to about 1100 psig at the end of the peak flow period.

Figure 4:
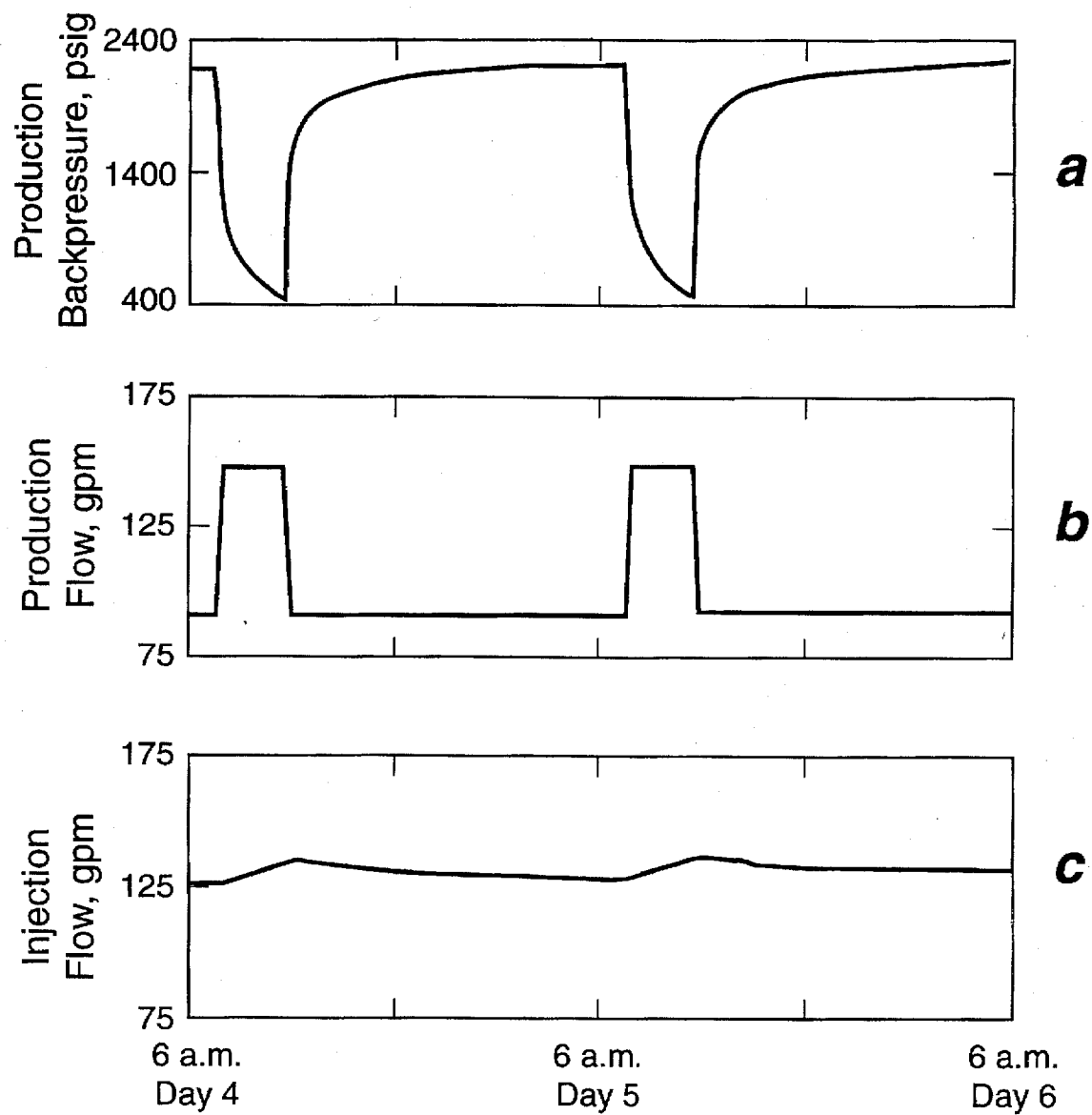
FIG. 4 depicts results of a test of the invention at the Fenton Hill HDR reservoir in northern New Mexico. Two cycles with 20 hour base periods and 4 hour peak periods are shown.

The Fenton Hill HDR reservoir was operated in a periodic mode in order to demonstrate the invention. FIG. 4 depicts results from the last two cycles of the 6 day long test. Injection flow, production flow, and production backpressure curves are shown on a common time scale. The curves have been smoothed. Injection pressure was maintained at a constant value of about 3960 psig by a pressure control system. Production flow rate was controlled at two values, a base rate for 20 hours and a peak rate for 4 hours, for a cycle duration of 24 hours. Mean base flow was about 92 gpm and mean peak flow was about 147 gpm. As can be seen in FIG. 4, the production well backpressure started dropping at the start of the peak flow period and rose upon the end of the peak flow period. The high value was about 2200 psig and the low value was about 480 psig. Injection flow rate varied, since injection pressure was controlled. Injection flow varied between about 126 gpm and 134 gpm. As can be seen from FIG. 4, injection flow increases as production backpressure falls. However, flow rate lags behind by about 1.25 hours, that is, the peaks of the injection flow rate curve occur about 1.25 hours after the low points of production backpressure.

During the two peak flow periods shown in FIG. 4, hot liquid flowing out of the production well rose to a temperature of about 378° F. Hot liquid temperature declined to about 359° F. during the base flow periods. During the 2 cycles of FIG. 4, temperature of cold liquid pumped into the injection well was maintained at a constant value of about 87° F. Production temperature increased upon increased rate of withdrawal from the reservoir; this is because heat loss from the water to the rock surrounding the production well, per unit mass of water flowing to the surface from the HDR reservoir, is reduced as production flow rate is increased. Before the 6 day long periodic mode test, the Fenton Hill HDR reservoir had been operated in a steady state manner at a flow rate of about 99 gpm, a production backpressure of about 2200 psig, and a hot liquid temperature of about 361° F. The average production flow rate during the last cycle of the test was about 102 gpm and mean recovered water temperature for that time period was about 363° F. It can be seen that the total power provided by the reservoir when it was operated in a cyclic mode was slightly greater than when it was operated in a steady state mode; use of the reservoir to follow load did not result in decreased total energy output.

While it is expected that water will be used in practice of this invention, any other liquid with appropriate properties may be substituted for water. The peak flow rate of this invention may vary during a second time period, or peak period, as long as it remains above the base flow rate. In a similar manner, the base flow rate is not limited to a single constant value during the first time period, or base period, but may vary. The key point is that production flow rate may be rapidly increased from a base value to a peak value and maintained at that value for a period of time before production flow rate is reduced to the base value. During each of the two time periods, the flow rate may vary about a mean value.

What is claimed is:

1. A method for continuously extracting energy from hot rock located beneath the surface of the earth, where the quantity of extracted energy is cycled in a periodic manner, said method comprising:

a. establishing a reservoir comprised of hot fractured rock beneath the surface of the earth;

b. continuously providing cold liquid to said reservoir through at least one injection well, where said injection well extends from the surface of the earth into the reservoir;

c. withdrawing hot liquid from the reservoir through at least one production well at a base rate of flow for a first time period, where said production well extends from the surface of the earth into the reservoir;

d. withdrawing hot liquid from the reservoir through the production well at a peak rate of flow for a second time period, where said second time period is of lesser duration than said first time period, where said peak flow rate is greater than said base flow rate, and where the temperature of hot liquid flowing out of the production well during the second time period is about equal to or greater than the temperature of hot liquid flowing out of the production well during the first time period;

e. continuously repeating steps c and d;

f. establishing the rate of flow of cold liquid into the reservoir at a value effective for maintaining the base flow rate and the peak flow rate for a plurality of cycles and g. extracting heat from hot liquid to form cold liquid which is provided to the reservoir.

2. The method of claim 1 where the rate of flow of cold liquid into the injection well is maintained at a substantially constant value.

3. The method of claim 1 where the pressure of cold liquid at the inlet of the injection well is maintained at a substantially constant value.

4. The method of claim 1 where the rate of flow of cold liquid into the injection well is greater than the rate of flow of hot liquid out of the production well during the first time period.

5. The method of claim 1 where the rate of flow of cold liquid into the injection well is about equal to or less than the rate of flow of hot liquid out of the production well during the second time period.

6. The method of claim 1 where the pressure of hot liquid flowing out of the production well during the first time period is greater than said hot liquid pressure during the second time period.

7. The method of claim 1 where the rate of flow of hot liquid out of the injection well is controlled at a first substantially constant value during the first time period and a second substantially constant value during the second time period.

8. The method of claim 1 where the pressure of hot liquid at the outlet of the production well is controlled at values effective to maintain flow at the base flow rate and at the peak flow rate.

* * * * *